United States Patent
Bryant

[15] 3,653,192
[45] Apr. 4, 1972

[54] METHOD AND APPARATUS FOR HARVESTING AQUATIC VEGETATION

[72] Inventor: Charles Brate Bryant, Route I, P.O. Box 150, Wildwood Point Road, Hartland, Wis. 53029

[22] Filed: Dec. 14, 1970

[21] Appl. No.: 97,738

[52] U.S. Cl. .................................................56/1, 56/9, 198/37
[51] Int. Cl. .......................................................A01d 45/08
[58] Field of Search ..................56/1, 8, 9; 37/54, 69; 198/37; 214/12–14; 222/59, 64, 65

[56] References Cited

UNITED STATES PATENTS

| 1,344,626 | 6/1920 | Ellis | 56/9 |
| 2,015,939 | 10/1935 | Justus | 198/37 |
| 1,259,524 | 3/1918 | Kelly | 198/37 |

Primary Examiner—Louis G. Mancene
Assistant Examiner—J. A. Oliff
Attorney—Wheeler, House & Wheeler

[57] ABSTRACT

A method for harvesting and transporting large quantities of aquatic vegetation. The apparatus includes a harvesting barge provided with paddle wheels and rudders for increased control in currents and wind and a series of longitudinally extending conveyors for moving the cut weeds onto a transport barge which is coupled in tandem with the harvesting barge. To compact the weeds and eliminate the need for a transport barge operator, the transport barge has a live bed controlled by a load sensor which activates the live bed to inch the weeds aftward on the transport barge as the weeds accumulate to a predetermined height in the hold. The transport barges are moved between the harvesting site and shore unloading site by a tugboat. The apparatus also includes a high capacity portable shore conveyor assembly which is adapted for all types of shore sites and which utilizes a first conveyor which can be supported by posts on the bottom of the lake or supported by a float and which includes coupling pins for connection with the couplers of the transport barge. A wheeled second conveyor is positioned on shore under the discharge end of the first conveyor, for conveying the weeds into a truck or pile. The second conveyor may be barge mounted.

1 Claims, 12 Drawing Figures

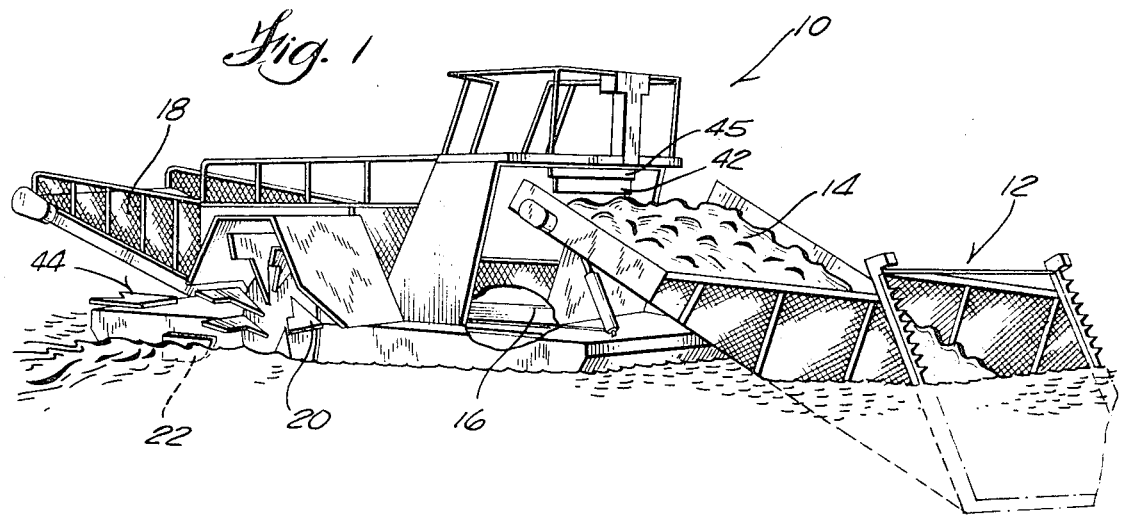
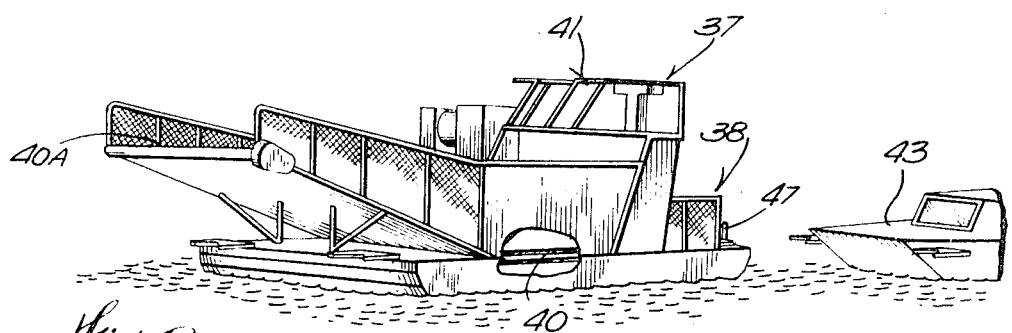
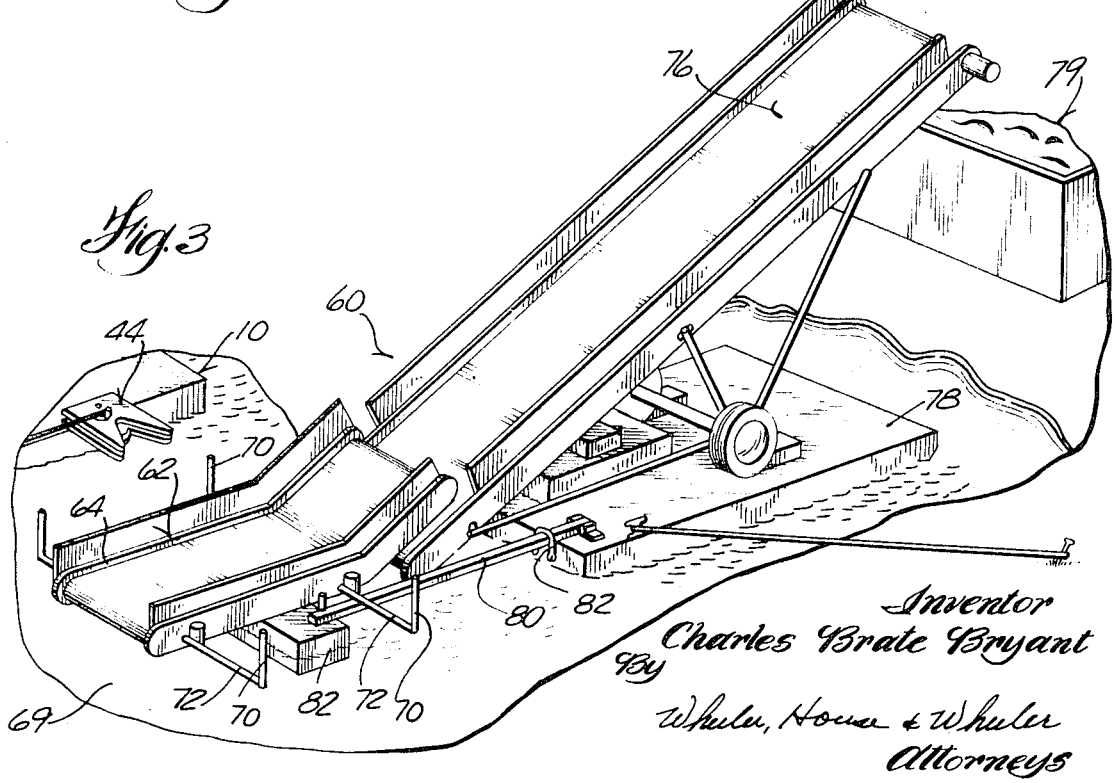

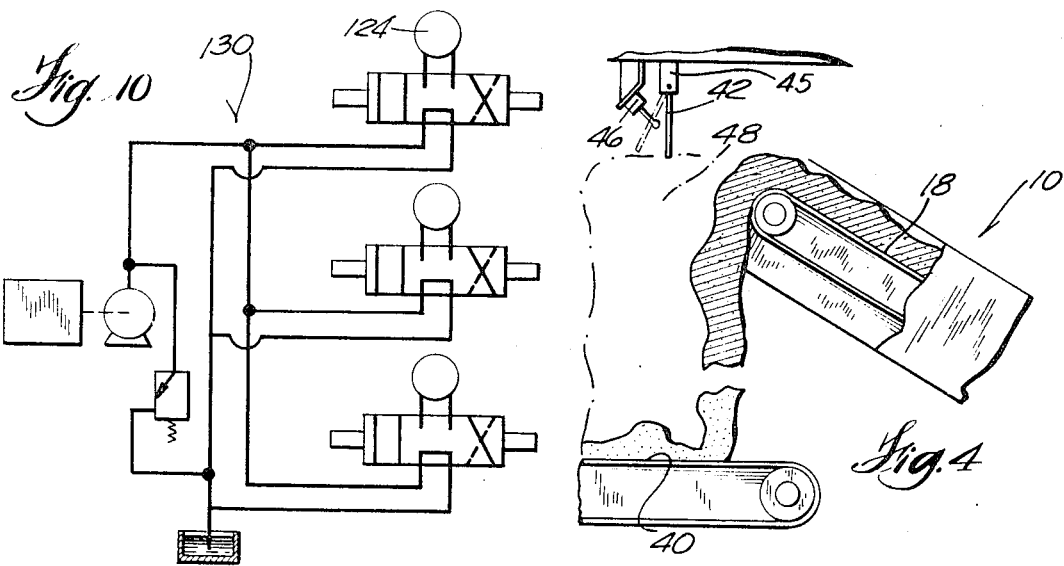
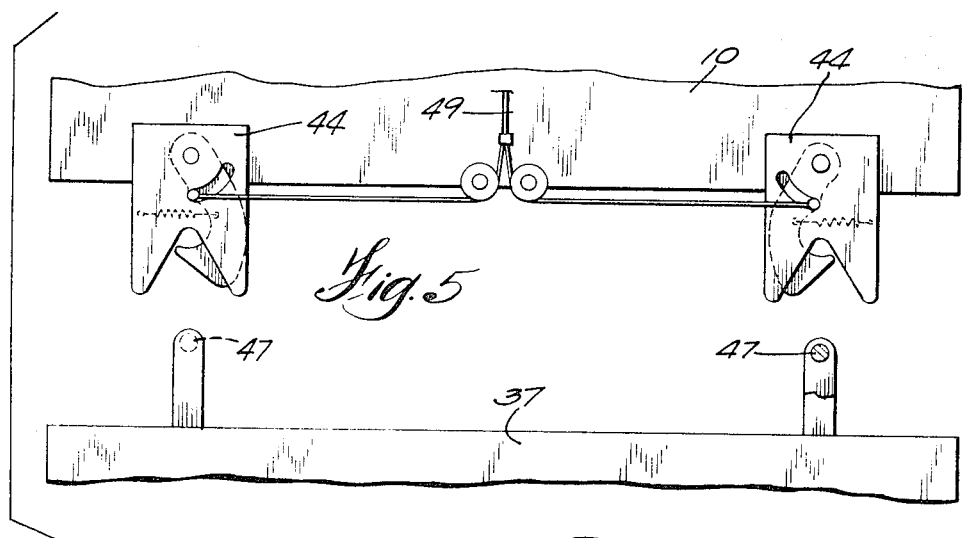
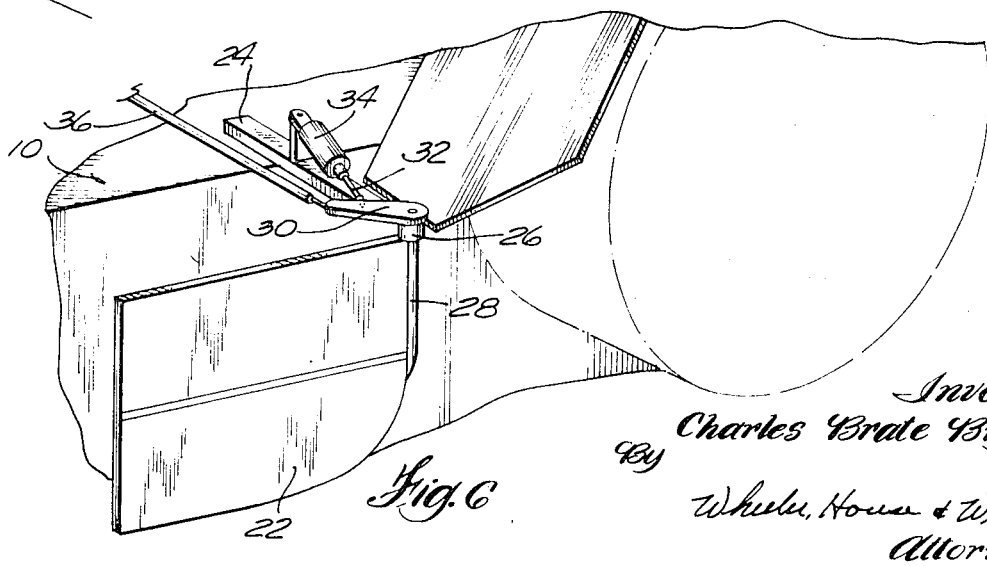

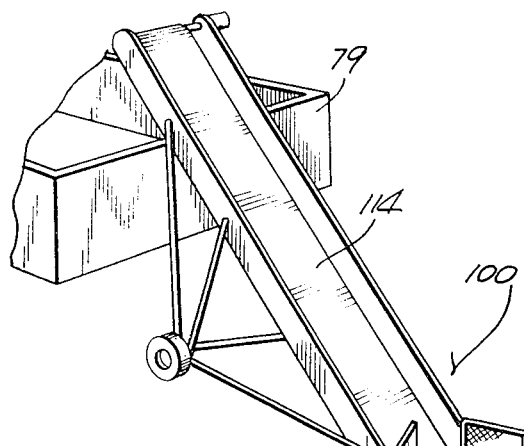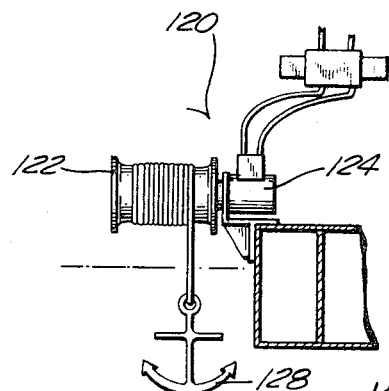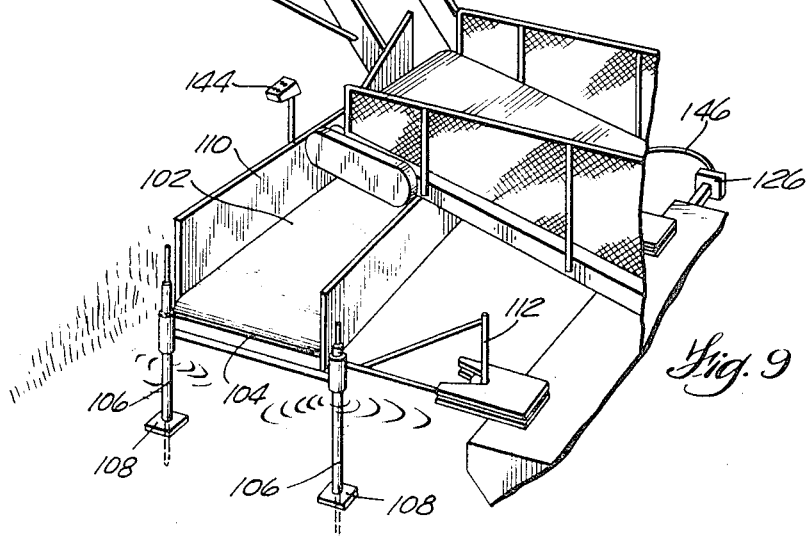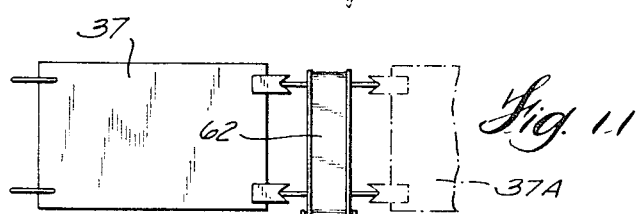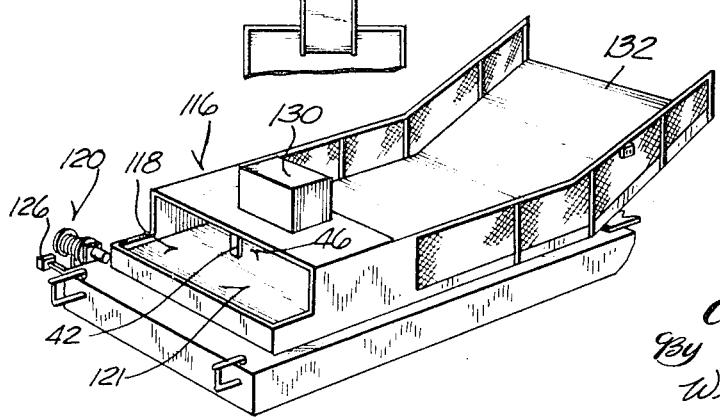

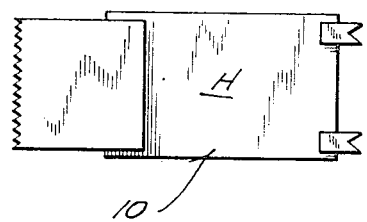
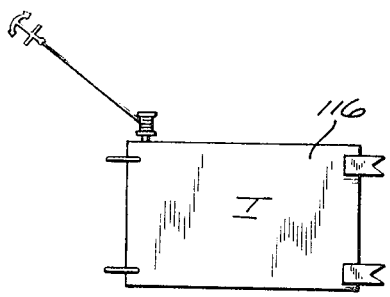
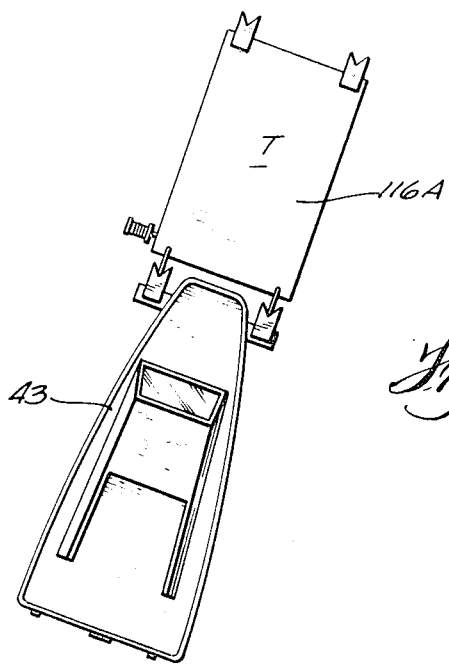
Fig. 12
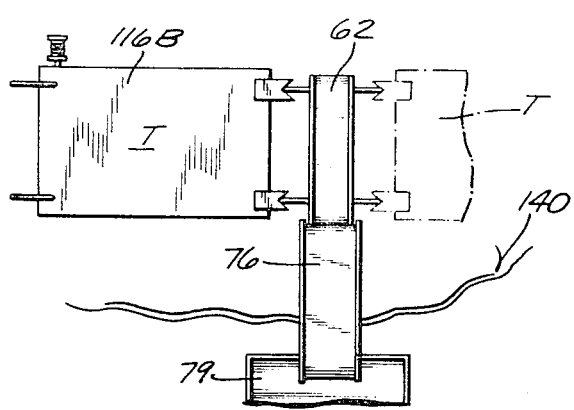
Inventor
Charles Brale Bryant
By
Wheler, Hous & Wheler
Attorneys

3,653,192

METHOD AND APPARATUS FOR HARVESTING AQUATIC VEGETATION

BACKGROUND OF INVENTION

The invention relates to apparatus and a method for harvesting large quantities of aquatic vegetation at a minimum cost and with minimum of personnel.

SUMMARY OF INVENTION

The invention provides apparatus and a method for harvesting large quantities of aquatic vegetation or weeds and loading the cut weeds onto a land vehicle for remote disposal. The apparatus includes one harvesting barge provided with a weed cutter and driven by paddle wheels located on opposite sides of the barge. Rudders located rearwardly of the paddle wheels provide more forward thrust and increased control in currents or wind.

To afford substantially continuous harvesting with the harvesting barge and eliminate trips to shore by the harvesting barge to unload the cut weeds, one or more and desirably three transport barges are employed. The transport barges are moved by a tugboat or other motorized vessel. The transport barges include coupling members at each end for coupling with the harvesting barge, the tug and a shore conveyor assembly at the various steps in the harvesting sequence. Automatic anchors on the transport barges are provided with remote controls accessible by the tugboat operator to facilitate anchoring of the empty transport barges at the harvesting site.

When the harvesting barge has filled its hold with a complement of cut weeds, the harvesting barge moves to and couples with an anchored transport barge. The weeds are transferred to the transport barge by a series of longitudinally extending conveyors on the harvesting barge. To compact the weeds on the transport barge and minimize the number of trips to shore required for unloading, and to eliminate the need for an operator on the transport barge, the transport barges are provided with a load sensing arrangement located above the transport barge loading bin. When the accumulated weeds in the loading bin have attained a self-compacting, predetermined height, a pivotally supported plate is displaced by the weeds to actuate a switch and energize a motor which activates the live bed of the loading bin to progressively inch the weed complement rearwardly from the loading bin as the weeds accumulate to the selected height.

When the transport barge is loaded, it is decoupled from the harvesting barge and the harvesting barge continues harvesting weeds at the harvesting site. When the tug returns to the harvesting site with an empty, and second, transport barge, the second transport barge is decoupled from the tug and anchored and the first transport barge is coupled with the tug and moved to the shore unloading site where a third transport is discharging its load unto the shore conveying assembly. While the second transport barge is unloading, the third now empty transport barge is moved to the harvesting area. Thus, a substantially continuous harvesting operation is provided using only two operators, one on the harvesting barge and one on the tug.

The invention also provides a shore conveying assembly for rapidly unloading the transport barge and loading the harvested weeds onto a truck or in a pile. The shore conveying assembly includes a first conveyor which has a frame which can be supported on the lake bottom by vertically adjustable posts or above the bottom by a float. The frame is provided with vertical coupling pins which couple with the couplings on the transport barge. The coupling pins are located on both sides of the frame so that two transport barges can be coupled to the shore conveying assembly at one time. The first conveyor discharges onto a second conveyor which is provided with wheels for transportation on the land. The wheeled conveyor can be supported adjacent the shore by a barge or on the shore.

Further objects and advantages of the invention will become apparent from the following disclosure.

DRAWINGS

FIG. 1 is a perspective view of a harvesting barge in accordance with the invention.

FIG. 2 is a perspective view of a transport barge in accordance with the invention.

FIG. 3 is an enlarged view of a barge-mounted shore conveyor assembly.

FIG. 4 is an enlarged fragmentary view of the load sensing arrangement.

FIG. 5 is an enlarged fragmentary plan view showing the coupling arrangement between the transport barge and harvesting barge.

FIG. 6 is an enlarged fragmentary perspective view of the rudder assembly for the harvesting barge.

FIG. 7 is a perspective view of a modified embodiment of a transport barge.

FIG. 8 is a fragmentary enlarged view of the anchor assembly shown in FIG. 7.

FIG. 9 is an enlarged perspective view of a shore mounted shore conveyor assembly.

FIG. 10 is a schematic diagram of the hydraulic circuit employed in the transport barge.

FIG. 11 is a diagramatic top view of two transport barges coupled to the shore unloading assembly.

FIG. 12 is a diagramatic view showing the sequence of steps of the harvesting method of the invention.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structures.

In the drawings, FIG. 1 shows an aquatic weed harvesting barge which is generally designated 10 and which includes a cutting assembly 12, a first conveyor 14 for conveying the cut vegetation into the barge, a live bed or second conveyor 16 and a discharge conveyor 18 for dumping the weeds into a transport barge as hereinafter described.

The harvesting barge 10 is propelled by right and left paddle wheels 20 which facilitate operation of the harvesting barge 10 in shallow water and in thick weed growth. The paddle wheels 20 are independently driven by reversible hydraulic motors (not shown). To increase the control of the harvesting barge 10 in winds and currents and provide more forward thrust, the invention provides a rudder assembly (FIG. 6) which includes a rudder 22 located aft of each of the paddle wheels. The rudders 22 are pivotally supported on the barge 10 by brackets 24, each having a boss 26 which receives a pin 28. The pins 28 are fixedly secured to the leading edge of the rudder. Swinging movement of the rudders 22 about the pivotal connections with the brackets 24 is afforded by arms 30 fixed to the pins 28. One of the arms 30 is pivotally connected to the piston rod 32 of a double acting hydraulic cylinder 34. The arm 30 is connected to a control rod 36 which is connected to the arm 30 on the oppositely located rudder pin 28 (not shown). Thus, both rudders change position by actuation of the cylinder 34.

The transport barge 37 disclosed in FIG. 2, includes a hold or a loading bin 38, provided with a live bed or first conveyor 40 and an inclined discharge conveyor 40A. In accordance with the invention, the transport barge is provided with load-sensing means to activate a live bed and move the weeds rearwardly from the loading bin 38 when the weeds accumulate to a preselected height. As disclosed, the means comprises a plate 42 (FIG. 4) which is hinged to a bracket 45. A switch 46 having a control member located rearwardly of the plate 42 is actuated upon rearward displacement of the plate 42 by the accumulated weeds 48. When the switch is actuated, it energizes suitable controls (FIG. 10) to actuate the live beds 40A and 40 and move the accumulated weeds rearwardly. As the loading bin is refilled, the live bed or conveyor 40 is again activated. The transport barge 37 can be provided with an operator station 41, if the barge 37 is self-propelled and the tug 43 is not always used to move the transport barge between the harvesting site and shore unloading site.

As best shown in FIG. 5, the harvesting barge 10, the transport barge 37 and the tug 43 are provided with pairs of spaced, pressure actuated couplings 44 which are commonly connected to an uncoupling control cable 49 for remote operation. The couplings 44 couple with vertical coupling pins 47 located on the transport barge and on the shore conveying assembly as hereinafter described. The coupling arrangement permits the transport barge to shift vertically downwardly as the transport barge 37 is loaded with weeds. The coupling arrangement also positively positions the transport barge longitudinally of the harvesting barge for inline movement of the weeds from the weed cutter to the loading bin 38 of the transport barge.

FIG. 3 discloses one embodiment of the shore conveying assembly of the invention, which is generally designated 60, and which includes a first conveyor 62 having a frame 64. Spaced vertical coupling pins 70 are secured to the frame 64 by horizontal posts 72. The coupling pins 70 permit transport barges to be coupled to the first conveyor 62 from either side as shown in FIG. 11 and afford upward vertical movement of the transport barge 37 as the barge 37 is unloaded.

The shore conveyor assembly 60 also includes a wheel supported second conveyor 76 which is supported above the water on a barge 78. Means are provided for supporting the first conveyor on the water. As disclosed, the means includes a pair of pivotally mounted stabilizing arms 80 on the barge 78. When in use, the stabilizing arms 80 are located under horizontal posts 72 and maintained in engagement therewith by a float 82, located at the free ends of the arms 80. The arms 80 are rigidified by clamps or holddowns 81. The float has sufficient buoyancy to support the first conveyor and the stabilizing arms and float minimize rolling and tilting of the barge due to variations in loading and location of the conveyor 76 on the barge. The second conveyor 76 loads the weeds in a pile or on a truck 79. The first conveyor 62 provides a structure for coupling with the transport barge 37. The second conveyor 76 and barge 78 permit the first conveyor 62 to be located in sufficiently deep water to enable the transport barge 37 to maneuver into a coupling position along the sides of the first conveyor 62.

FIG. 9 discloses a further embodiment of a shore unloading assembly which is generally designated 100. In this embodiment, a first conveyor 102 is supported on a frame 104. The frame is supported on the shore or lake bed by a plurality of vertically adjustable posts 106, each having a foot plate 108. The conveyor 102 is provided with detachable side walls 110. Side walls of 110 of varying heights are desirable to facilitate unloading of different types of weeds. Coupling pins 112 are provided on one or both sides of the conveyor 102.

The conveyor 102 discharges into a wheeled conveyor 114 for discharge into the truck 79.

FIG. 7 shows a further embodiment of a transport barge 116 which includes a loading bin 118 with a conveyor 121 which forms a live bed for the hold. The transport barge 116 includes the load sensing plate 42 and switch 46.

The transport barge 116 is also provided with an anchor assembly 120 (FIG. 8) which includes a drum 122 driven by a reversible hydraulic motor 124. To afford remote operation of the anchor assembly, an electrical switch control box 126 is mounted for access by the operator of the tugboat 43 when the tug 43 is coupled to the transport barge. Thus, the anchor 128 can be raised and lowered with the tug operator remaining on the tug.

The transport barge 116 also includes an engine, hydraulic pump, and solenoid valve assembly 130 (FIGS. 7, 10) for operating the hydraulic motors for the anchor assembly, the conveyor 121 and an inclined discharge conveyor 132.

In operation of the apparatus of the invention and in practicing the method, the harvesting barge 10 is moved into a suitable weed harvesting site 136 (FIG. 12) by the harvesting barge operator and the cutting of vegetation commenced.

A first transport barge 116 is moved to the harvesting site 136 and anchored. When the hold of the harvesting barge 10 is filled, it couples with the transport barge 116 and transfers the complement of weeds to the transport barge 116. The harvesting barge 10 is decoupled using control cable 49, then returns to the harvesting area and continues to cut weeds.

The tug 43 brings an empty transport 116A to the harvesting site 136 and anchors the tug 116A at the site and decouples. The tug 43 next couples with the filled transport barge 116 and the tug operator raises the anchor and the barge 116 is moved to the shore unloading site 140 and coupled to the shore unloading assembly. The unloaded transport 116B is then moved to the harvesting site and the sequence continued.

The tug operator can also operate the shore unloading assembly and control the conveyors on the transport barges using a remote control switch or valve assembly 144 (FIG. 9) which is connected to valve and pump assembly 130 by a cable 146.

Various of the features of the invention are set forth in the following claims.

What is claimed is:

1. A method of harvesting aquatic vegetation comprising the steps of cutting vegetation with a self-propelled harvesting barge and filling the hold of the harvesting barge with cut vegetation, moving the harvesting barge to an anchored transport barge having a loading bin with an automatically controlled live bed, coupling the harvesting barge to the transport barge and transfering the vegetation complement of the harvesting barge into the transport barge, accumulating the weeds on the live bed of the transport barge until they attain a pre-determined height, progressively moving the accumulated weeds rearwardly on the transport barge by automatic actuation of the live bed in response to attainment of said predetermined height, and moving the filled transport barge to a shore conveyor using a self-propelled vessel, and recommencing cutting with the harvesting barge.

* * * * *